United States Patent
Doemling et al.

(10) Patent No.: US 10,958,846 B2
(45) Date of Patent: Mar. 23, 2021

(54) METHOD, DEVICE AND SYSTEM FOR CONFIGURATION OF A SENSOR ON A MOVING OBJECT

(71) Applicant: Bayerische Motoren Werke Aktiengesellschaft, Munich (DE)

(72) Inventors: Maximilian Doemling, Shanghai (CN); Sebastian Granzow, Kirchheim (DE); Wanli Jiang, Shanghai (CN); Qianshan Li, Shanghai (CN); Rick Li, Shanghai (CN); Bill Lv, Shanghai (CN); Ivan Xu, Shanghai (CN); Tomas Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/533,669

(22) Filed: Aug. 6, 2019

(65) Prior Publication Data
US 2019/0364219 A1 Nov. 28, 2019

Related U.S. Application Data

(63) Continuation of application No. PCT/CN2017/073052, filed on Feb. 7, 2017.

(51) Int. Cl.
*H04N 7/18* (2006.01)
*H04N 5/232* (2006.01)
(Continued)

(52) U.S. Cl.
CPC ..... *H04N 5/23299* (2018.08); *H04N 5/23212* (2013.01); *H04N 5/23296* (2013.01);
(Continued)

(58) Field of Classification Search
CPC .. H04N 7/18; H04N 5/23299; H04N 5/23212; H04N 5/23296;
(Continued)

(56) References Cited

U.S. PATENT DOCUMENTS 9,571,977 B2 * 2/2017 Kadous ................. H04W 4/023
9,596,562 B2 * 3/2017 Parameshwaran ........ G01S 5/02
(Continued)

FOREIGN PATENT DOCUMENTS

CN 104914457 A 9/2015
CN 104956236 A 9/2015
(Continued)

OTHER PUBLICATIONS

PCT/CN2017/073052, International Search Report dated Oct. 31, 2017 (Two (2) pages).

*Primary Examiner* — Trang U Tran
(74) *Attorney, Agent, or Firm* — Crowell & Moring LLP (57) ABSTRACT

A method for configuring a sensor, which is adapted to be installed on a moving object, includes obtaining localization information of the sensor from a localization device, obtaining characteristic information and localization information of at least one element from a digital map, and choosing one or more elements of the at least one element in the digital map. The method also includes configuring the sensor according to the characteristic information and/or the localization information of the one or more chosen elements.

18 Claims, 6 Drawing Sheets

(51) Int. Cl.
   *G01S 7/497* (2006.01)
   *G01S 13/931* (2020.01)
   *G05D 1/02* (2020.01)

(52) U.S. Cl.
   CPC .............. *G01S 7/497* (2013.01); *G01S 13/931* (2013.01); *G01S 2013/9323* (2020.01); *G05D 1/0231* (2013.01); *G05D 2201/0213* (2013.01)

(58) Field of Classification Search
   CPC ............. G01S 2013/9323; G01S 7/497; G01S 13/931; G05D 1/0231; G05D 2201/0213
   USPC ......................................................... 348/148
   See application file for complete search history.

(56) References Cited

U.S. PATENT DOCUMENTS 10,292,107 B2 *   5/2019   Park .................... H04W 4/029
2013/0314278 A1   11/2013   Lim et al.

FOREIGN PATENT DOCUMENTS

CN          105738655 A     7/2016
CN          106157342 A    11/2016

* cited by examiner

METHOD, DEVICE AND SYSTEM FOR CONFIGURATION OF A SENSOR ON A MOVING OBJECT

CROSS REFERENCE TO RELATED APPLICATION

This application is a continuation of PCT International Application No. PCT/CN2017/073052, filed Feb. 7, 2017, the entire disclosure of which is herein expressly incorporated by reference.

BACKGROUND AND SUMMARY OF THE INVENTION

The present invention relates to a method for configuration of a sensor on a moving object, especially a vehicle or a robot. Furthermore, the invention also relates to device, system and vehicle for configuration of a sensor on the moving object.

To reduce vehicle crashes and provide more comfortable driving experience, driver-assistance systems, such as collision warning and avoidance, lane-keeping assistance and speed control, are being used in passenger vehicles. The detection of obstacles such as other vehicles, traffic signs, and obstructions is a crucial step in driving assistant systems and in the operation of intelligent vehicles, such as the highly automated driving, HAD, vehicles. An intelligent vehicle senses its environment using sensors and makes decisions for autonomous operation. The identification of stationary and moving objects around the vehicle is also important for driving assistant systems, such as adaptive cruise control, pedestrian detection, and speed control. The driving assistant system and the HAD technique can also be implemented in robotics.

The driving assistant system combines the remote-sensor-based recognition of lane and other traffic elements in the real time environment, e.g. traffic signs, traffic lights and barriers, and corresponding control. Based on the recognition of the traffic elements, the driving assistant system or the HAD system can determine the traffic situation, e.g. speed limit and red light, so that the driving assistant system can conduct approach control and the vehicle can react accordingly.

Since the traffic elements are normally distant from the vehicle, the information data, e.g. point cloud or images, of the traffic elements detected by the remote sensing devices are not clear enough for the recognition of details of the traffic elements. For example, after scanning the real time environment, the vehicle can recognize a traffic sign for speed limit on the road based on the image recorded by the camera on the vehicle. However, the vehicle cannot determine the speed limit on this road, as the image do not have the sufficient definition for recognizing the exact digits on the traffic sign.

An object of the present invention is to provide a method and a device for configuration of a sensor on a moving object which can provide sensing data of element on the road or roadside with high definition.

Embodiments of the present invention provide a method, a device, a system and a vehicle for configuration of a sensor on the vehicle or robot, which enable sensing data of the elements on the road or at roadside with high definition.

Accordingly, a method for configuration of a sensor which is adapted to be installed on a moving object, especially a vehicle or a robot, is provided, comprising: obtaining, by a data processing device, localization information of the sensor, from a localization device; obtaining, by the data processing device, characteristic information and localization information of the at least one element from a digital map; choosing, by the data processing device, at least an element in the digital map; and configuring, by the data processing device, the sensor according to the characteristic information and/or the localization information of the at least one element.

In a possible implementation manner, the sensor comprises: at least a laser scanner, and/or at least an image signal recording device, especially a stereo camera; and/or at least a Radar device.

In a further possible implementation manner, the characteristic information of the at least one element comprises: type of the element in the digital map, and/or dimension information of the element in the digital map, and/or correlation coefficient of the element in the digital map.

In another further possible implementation manner, the sensor is configured according to the characteristic information of the at least one element; and/or the localization information of the at least one element.

In another further possible implementation manner, the localization device comprises: global navigation satellite system receiver, especially a Global Positioning System (GPS) device, or a localization device using cellular signal, or a localization device using radio signal. The localization device using cellular signals measures the distances between the vehicle and at least three base stations of mobile communication by using the cellular signals of the base stations respectively, and calculates the localization of the vehicle by using the distances to the base stations.

In another further possible implementation manner, the step "choosing, by the data processing device, at least an element in a digital map" comprises: choosing the at least an element according to the characteristic information of the at least one element, and/or localization information of the at least one element.

In another further possible implementation manner, the step "configuring, by the data processing device, the sensor according to the characteristic information of the at least one element" comprises: obtaining, by the data processing device, the orientation of the sensor; calculating, by the data processing device, a relative position of the at least one element relative to the sensor by using the localization information of the sensor, the localization information of the at least one element and the orientation of the sensor; and configuring, by the data processing device, the sensor according to the relative position of the at least one element relative to the sensor.

In another further possible implementation manner, step "configuring, by the data processing device, the sensor according to the characteristic information and/or the localization information of the at least one element" comprises: configuring the sensor to aim at the at least one element according to the relative position of the at least one element relative to the sensor; and/or configuring the sensor to enhance resolution on a scanning area according to the relative position of the at least one element relative to the sensor.

In another further possible implementation manner, if the sensor comprises the at least a laser scanner, the step d3) "configuring, by the data processing device, the sensor according to the relative position of the at least one element relative to the sensor" further comprises: configuring the at least a laser scanner by increasing the number of laser rays at a scanning area according to the relative position of the at least one element relative to the sensor.

In another further possible implementation manner, if the sensor comprises the at least an image signal recording device, the step d3) "configuring, by the data processing device, the sensor according to the relative position of the at least one element relative to the sensor" further comprises: focusing the at least an image signal recording device according to the relative position of the at least one element relative to the sensor; and/or zooming the at least an image signal recording device according to the dimension information of the element in the digital map.

According to a further aspect, a data processing device for configuration of a sensor which is adapted to be installed on a moving object, especially a vehicle or a robot, is provided, wherein the data processing device is adapted to: obtain localization information of the sensor, from a localization device; obtain characteristic information and localization information of the at least one element from a digital map; choose, by the data processing device, at least an element in the digital map; and configure the sensor according to the characteristic information and/or the localization information of the at least one element.

In a possible implementation manner, the sensor comprises: at least a laser scanner, and/or at least an image signal recording device, especially a stereo camera; and/or at least a radar device.

In another further possible implementation manner, wherein the characteristic information of the at least one element comprises: type of the element in the digital map, and/or dimension information of the element in the digital map, and/or correlation coefficient of the element in the digital map.

In another further possible implementation manner, the data processing device is adapted to configure the sensor according to the characteristic information of the at least one element; and/or the localization information of the at least one element.

In another further possible implementation manner, wherein the localization device comprises: global navigation satellite system receiver, especially a GPS device, or a localization device using cellular signal, or a localization device using radio signal.

In another further possible implementation manner, the data processing device chooses the at least an element according to the characteristic information of the at least one element; and/or localization information of the at least one element.

In another further possible implementation manner, the data processing device is further adapted to: obtain, by the data processing device, the orientation of the sensor; calculate, by the data processing device, a relative position of the at least one element relative to the sensor by using the localization information of the sensor, the localization information of the at least one element and the orientation of the sensor; and configure, by the data processing device, the sensor according to the relative position of the at least one element relative to the sensor.

In another further possible implementation manner, the data processing device: configures the sensor to aim at the at least one element according to the relative position of the at least one element relative to the sensor; and/or configures the sensor to enhance resolution on a scanning area according to the relative position of the at least one element relative to the sensor.

In another further possible implementation manner, if the sensor comprises the at least a laser scanner, the data processing device configures the at least a laser scanner by increasing the number of laser rays at a scanning area according to the relative position of the at least one element relative to the sensor.

In another further possible implementation manner, if the sensor comprises the at least an image signal recording device, the data processing device is further adapted to focus the at least an image signal recording device according to the relative position of the at least one element relative to the sensor; and/or zoom the at least an image signal recording device according to the relative position of the at least one element relative to the sensor and the dimension information of the element in the digital map.

According to a further aspect, a system comprising an above-mentioned data processing device and at least a sensor is provided.

In a possible implementation manner, the sensor comprises at least a laser scanner.

In another further possible implementation manner, the sensor comprises at least an image signal recording device, especially a stereo camera.

According to a further aspect, a vehicle or a robot comprising an above-mentioned system is provided.

In the embodiments of the present invention, the method or the data processing device for configuration of a sensor mounted on a vehicle may obtain the localization information of the sensor and the characteristic information which indicates the type of the element and/or correlation coefficient of the element and/or dimension of the element and localization information of the element. The meaningful elements such as traffic sign and lights can be chosen by using the characteristic information of the elements. Furthermore, a relative position of the element relative to the sensor can be calculated by using the localization information of the sensor and the localization information of the element. In order to obtain sensing data of the element, the data processing device according to the invention configures the sensor to aim at the at least one element according to the relative position of the at least one element relative to the sensor. Furthermore, the data processing device according to the invention can configure the sensor to enhance resolution on a scanning area according to the relative position of the at least one element relative to the sensor. For example, a stereo camera can accurately focus on the chosen element on the road and select proper zooming parameter to improve the resolution and clarity of the sensing data of the element on the road or at the roadside.

Therefore, the element on the road or at the roadside can be detected purposefully and the resolution and clarity of the sensing data of the element can be improved significantly. Thus, the traffic elements can be determined more clearly with more details by using the sensing data with high definition.

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Other objects, advantages and novel features of the present invention will become apparent from the following detailed description of one or more preferred embodiments when considered in conjunction with the accompanying drawings.

DETAILED DESCRIPTION OF THE EXEMPLARY EMBODIMENTS

The following describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
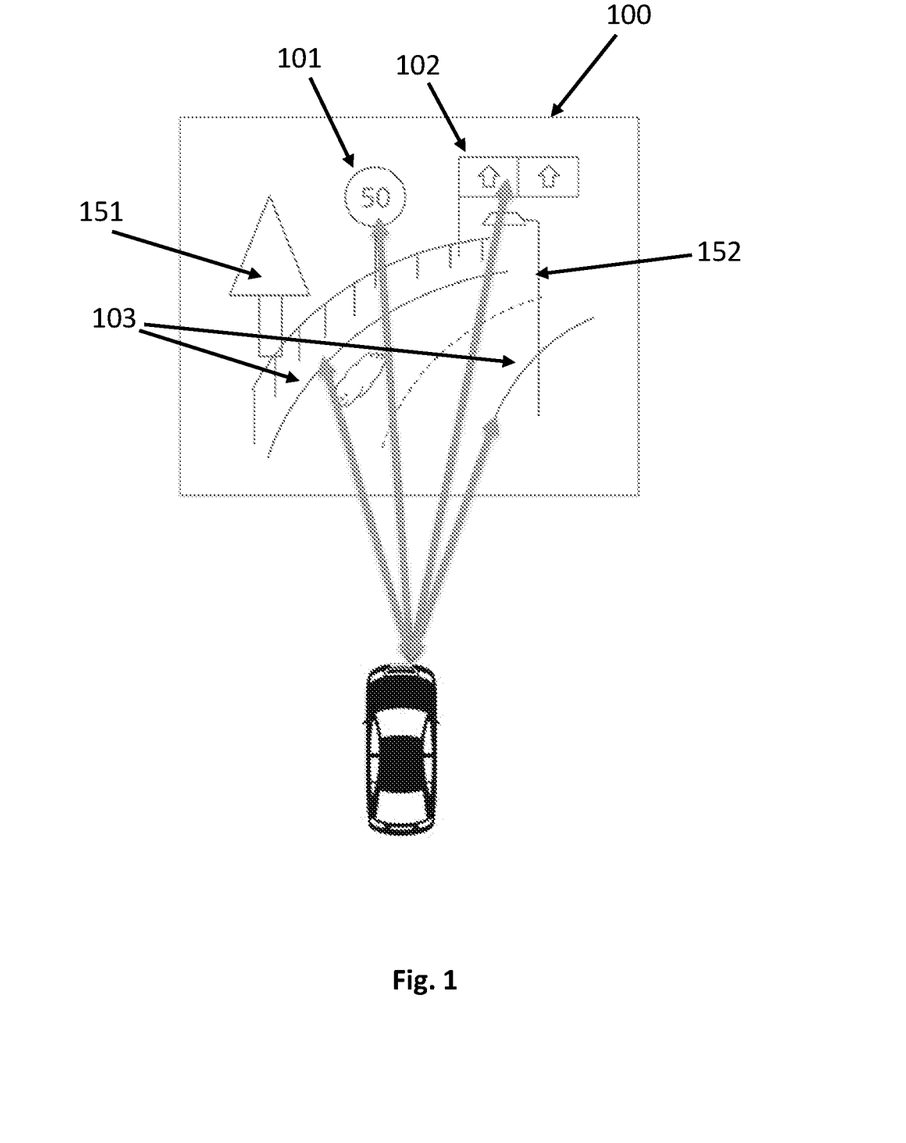
FIG. 1 shows an example of the real time environment of the vehicle comprising a number of elements.

A vehicle equipped with remote-sensing equipment around its periphery is shown in FIG. 1. Vehicle mounted scanners are used to detect obstructions such as traffic signs, lane markings, and other vehicles. Various types of scanners i.e. remote scanning devices, including laser scanners, stereo camera, piezoelectric, radar scanners, ultrasonic and video camera are used for this purpose. Among these different types of sensors, laser scanners provide promising performance due to their high accuracy, fine resolution, and the ability to work in adverse weather conditions such as snow or rain.

As shown in FIG. 1, the real time environment 100 of the vehicle comprises a number of elements such as a traffic sign 101 indicating a speed limit of "50", an overhead traffic sign 102, lane markings 103, a tree 151 at the road side and a street lamp 152. To be noted, the real time environment 100 shows only a part of the environment of the vehicle, more specifically, the environment faced by the vehicle in the driving direction.

The vehicle can detect the real time environment 100 by using at least one remote sensing device, e.g. a Laser scanner, a camera especially a stereo camera and a Radar device. Obviously, the traffic sign 101 indicating a speed limit of "50", the overhead traffic sign 102 and the lane markings 103 have more meaningful details which can instruct the driving activities of the vehicle than the tree 151 at the road side and the street lamp 152. Therefore, the elements such as the traffic sign 101 indicating a speed limit of "50", the overhead traffic sign 102 and the lane markings 103 are most important and interesting for the vehicle.

Figure 2:
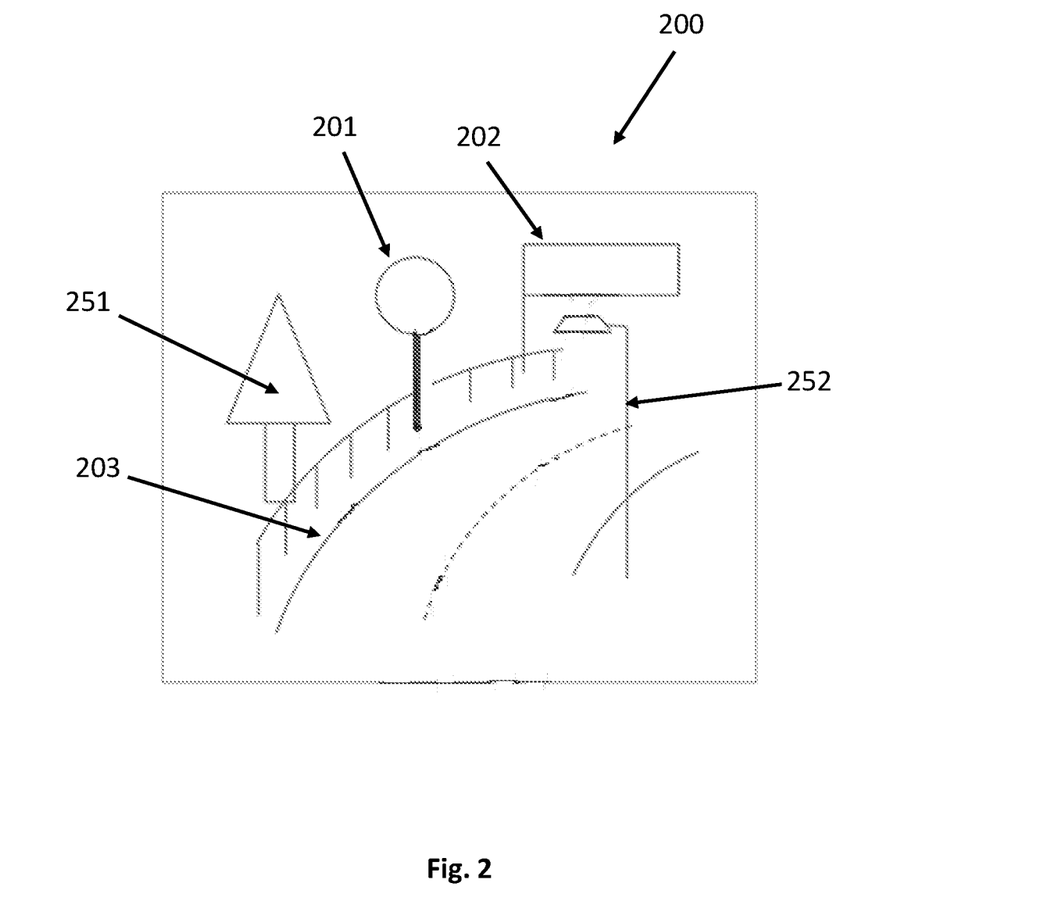
FIG. 2 shows an example of a part of a digital map presenting the corresponding elements.

FIG. 2 illustrates a part of a digital map 200 corresponding to the localization of the vehicle and showing a number of elements 201, 202, 203, 251 and 252 recorded in the digital map. The elements 201, 202, 203, 251 and 252 in the digital map 200 showed in FIG. 2 correspond to the elements 101, 102, 103, 151 and 152 of the real time environment 100.

The digital map 200 records the localization information of the elements, so that the elements can be presented properly in the coordinate system of the digital map 200.

The digital map 200 records also the characteristic information of the elements recorded in the digital map 200. The characteristic information serves a label of the element and providing further information of the corresponding element, so that the road condition and traffic elements can be described with more details.

The characteristic information comprises the types of the element in the digital map 200, for example "traffic sign", "lane markings", "tree" and "street lamp".

The characteristic information can also comprise the correlation coefficients which indicate correlation and importance of the elements in the digital map.

Furthermore, the characteristic information also comprises dimension information of the element in the digital map 200 which describes the length, depth and height of each element.

For example, the characteristic information of the element 201 can be constructed as: "type=traffic sign", "correlation coefficient=very high" and "length=0.5 m, depth=0.1 m, height=2.2 m", the characteristic information of the element 202 can be constructed as: "type=overhead sign", "correlation coefficient=high" and "length=4 m, depth=0.1 m, height=4 m" and the characteristic information of the element 251 can be constructed as: "type=plant", "correlation coefficient=normal" and "length=1.6 m, depth=1.6 m, height=3.5 m".

Figure 3:
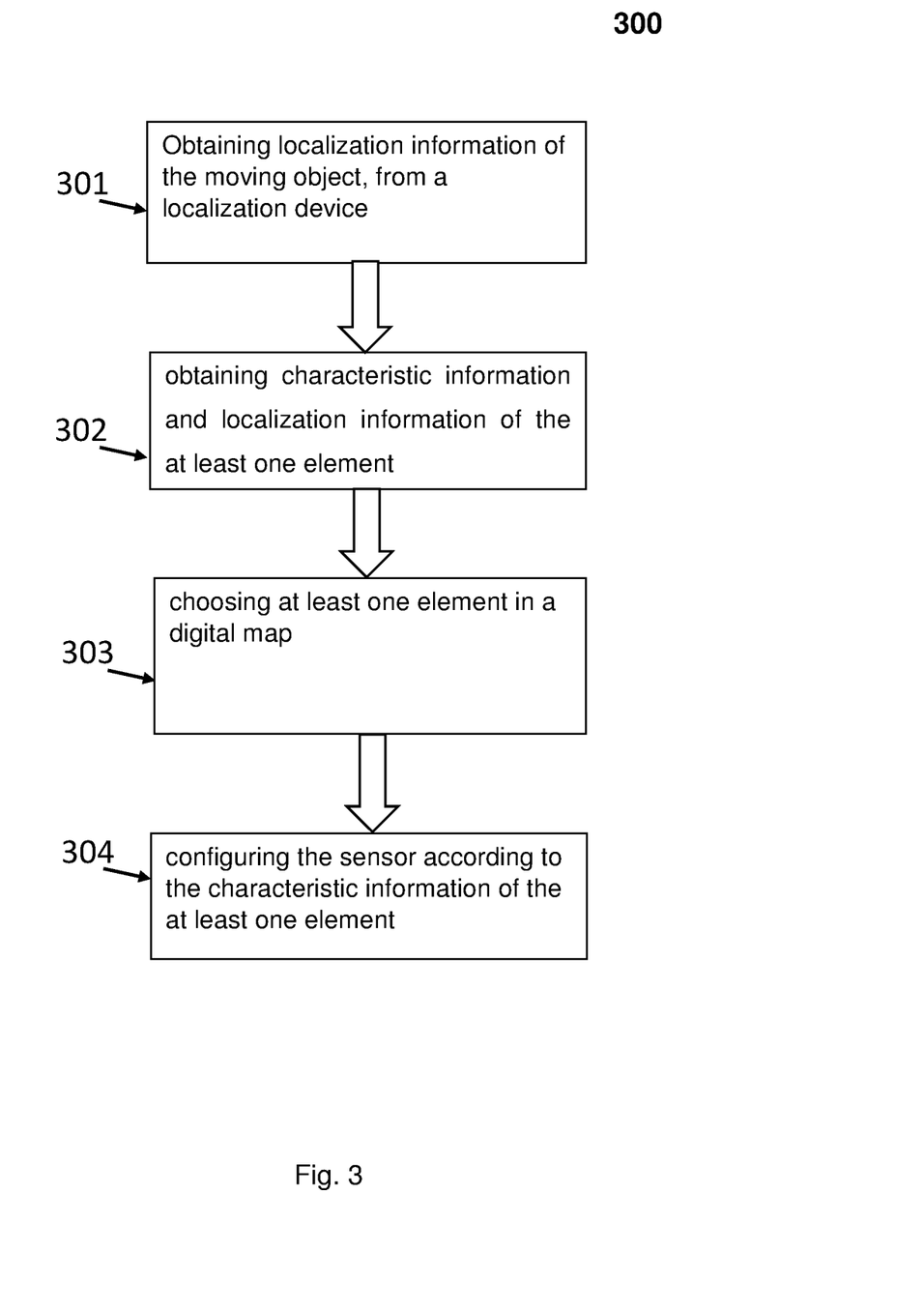
FIG. 3 is a schematic diagram of an embodiment of the method for configuration of a sensor according to the present invention.

FIG. 3 shows a schematic diagram of an embodiment of the method for configuration of a sensor which is adapted to be installed on a moving object, especially a vehicle or a robot. The method can be implemented by a data processing device, e.g. a processor with corresponding computer program.

Firstly, according to the step 301, localization information of the sensor, i.e. the vehicle mounted remote sensing device, is same as the localization of the vehicle, therefore, the localization information of the sensor can be obtained from a localization device of the vehicle, such as Global Positioning System, GPS, equipment, a localization device using cellular signal, or a localization device using radio signal.

As shown in the step 302, the digital map, especially a navigation map which comprises localization information and characteristic information of the elements on the road or at the roadside in the digital map (e.g. the elements 201, 202, 203, 251 and 252) can be obtained from e.g. the onboard navigation system in the vehicle. As mentioned above, the characteristic information of the elements includes the types of the elements, the correlation coefficients of the elements and dimension information of the elements.

According to the step 303, at least one element in the digital map can be chosen according to the localization information and the characteristic information of the sensor and the localization information of the elements in the digital map, e.g. the elements 201, 202, 203, 251 and 252.

A distance between the sensor, i.e. the vehicle, and the elements can be calculated using the localization information of the sensor and the localization information of the elements 201, 202, 203, 251 and 252. Elements near the vehicle, for example a distance less than 300 meter, can be chosen from the digital map. Elements can also be chosen according to their characteristic information, for example "type=traffic sign" or "correlation coefficient=high".

According to the step 304, the sensor is configured according to the characteristic information and the localization information of the chosen elements.

At first, the orientation of the sensor can be obtained based on the orientation of the vehicle which can be obtained from the navigation system and/or localization equipment of the vehicle. Then, since the element on the road or at the roadside corresponds to the element in the digital map, a relative position of the element on the road or at the roadside relative to the sensor can be calculated by using the localization information of the sensor, the orientation of the sensor, and the localization information of the element.

The sensor can be configured according to the relative position of the at least one element relative to the sensor. More specifically, the sensor can be configured to aim at the element, e.g. the element 101 which is a traffic sign relatively near to the vehicle and has a very high correlation coefficient, according to the relative position of the element 101 relative to the vehicle. Moreover, the sensor can be configured to enhance the scanning resolution on a scanning area, e.g. the place and the area of the element 101, according to the relative position of the element 101 relative to the sensor.

The characteristic information also indicates the dimension information of the element 101 which can be used to define the scanning area of the element 101 more accurately.

In case that the sensor is a laser scanner, the laser scanner can be configured by increasing the number of laser rays at a scanning area according to the relative position of the element 101 relative to the laser scanner, i.e. the vehicle.

In case that the sensor is a camera, especially a stereo camera, the camera can be configured by focusing the camera according to the relative position of the element 101 relative to the sensor, i.e. the vehicle. Furthermore, the camera can be configured by zooming the camera according to the dimension information of the element 101 obtained from the digital map.

Advantageously, the meaningful elements such as traffic sign 101 can be chosen by using the characteristic information and the localization information of the corresponding element 201 in the digital map. Furthermore, a relative position of the element relative to the sensor (e.g. the laser scanner or the video camera) can be calculated, so that the sensor can be configured to aim at the element 101 according to the relative position relative to the sensor. Furthermore, the sensor can enhance scanning resolution on a scanning area at the place of the element 101.

Figure 5:
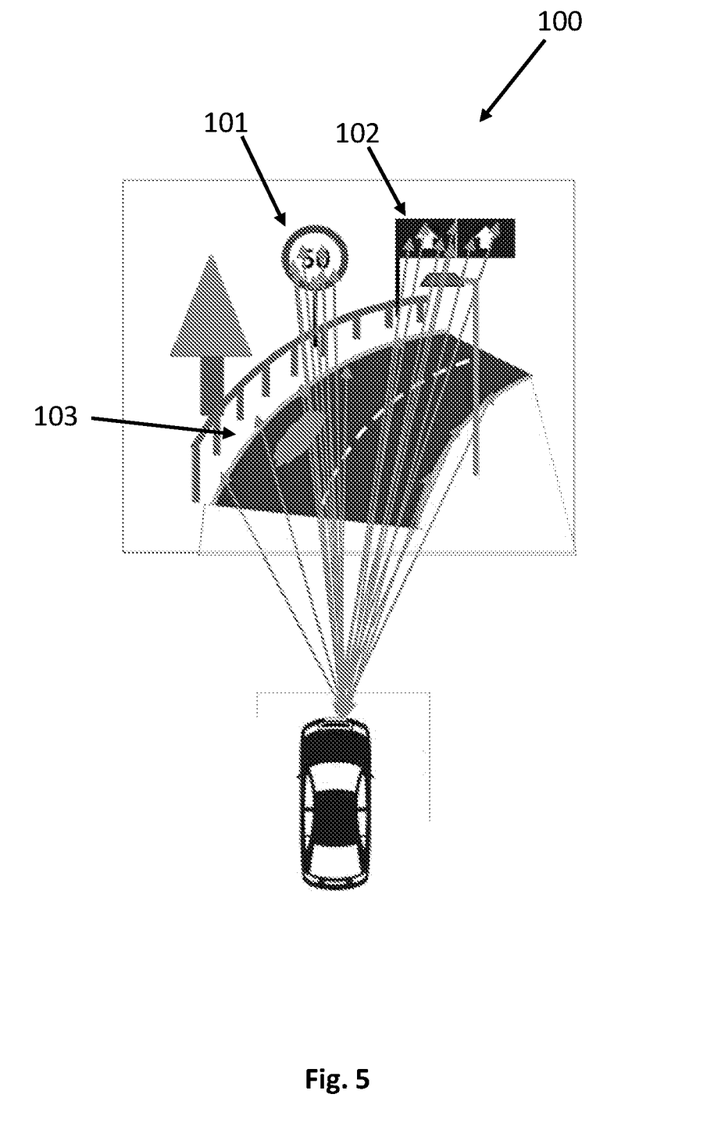
FIG. 5 shows an example of the use of the laser scanner according to the present invention.
Figure 6:
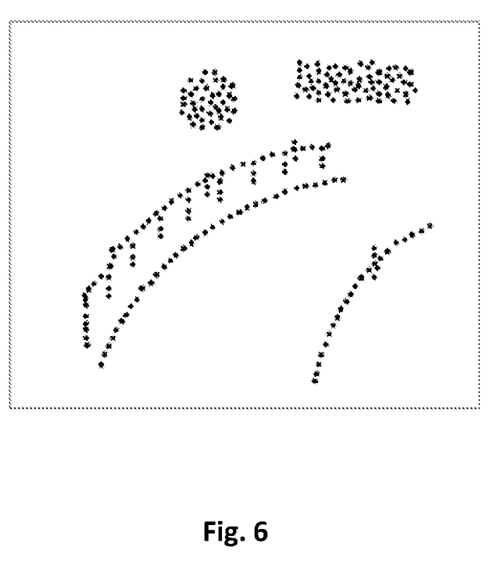
FIG. 6 shows an example of the cloud point detected by the laser scanner.

Particularly, as shown in FIG. 5, a laser scanner can increase the number of laser rays at a scanning area according to the relative position of the element 101 which can enhance the definition for the sensing data (as shown in FIG. 6) of the elements. In case of the camera, it can accurately focus on the chosen element 101 based on relative position and the distance between the camera and the element 101, and can select proper zooming parameter based on the dimension information of the element 101 to improve the resolution and clarity of the sensing data of the element 101.

Figure 4:
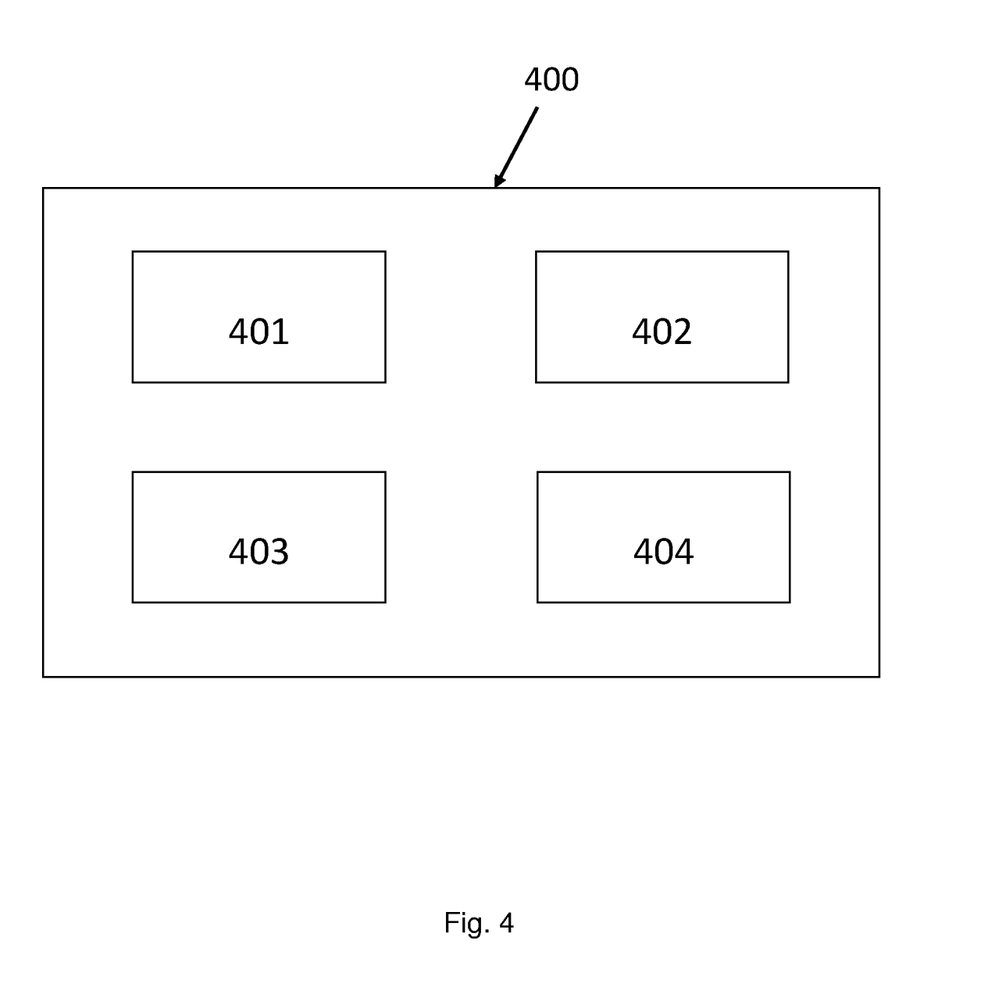
FIG. 4 is a schematic diagram of an embodiment of the data processing device for configuration of the sensor according to the present invention.

FIG. 4 shows a schematic diagram of the data processing device 400 according to the present invention. The data processing device 400 can be implemented in a vehicle or a robot.

The data processing device 400 can implement the above-mentioned method for determining localization. The data processing device is adapted to: obtain localization information of the sensor, from a localization device; obtain characteristic information and localization information of the at least one element from a digital map; choose at least an element in the digital map; and configure the sensor according to the characteristic information and/or the localization information of the at least one element.

More specifically, the data processing device comprises a localization information module 401 which is adapted to obtain the localization information of the sensor, i.e. the vehicle, from a localization device, an element-obtaining module 402 which is adapted to obtain characteristic information and localization information of the at least one element from a digital map, a choosing module 403 which is adapted to choose at least an element in the digital map, and a configuring module 404 which is adapted to configure the sensor according to the characteristic information and/or the localization information of the at least one element.

The sensor comprises: at least a laser scanner, and/or at least an image signal recording device, especially a stereo camera; and/or at least a Radar device.

The characteristic information of the at least one element comprises: type of the element in the digital map, and/or dimension information of the element in the digital map, and/or correlation coefficient of the element in the digital map.

The data processing device is adapted to configure the sensor according to the characteristic information of the at least one element; and/or according to the localization information of the at least one element.

The localization information module 401 obtains the localization information by using the localization device such as GPS receiver, a localization device using cellular signal, or a localization device using radio signal.

The at least an element can be chosen according to the characteristic information of the at least one element; and/or according to localization information of the at least one element.

The data processing device 400 is further adapted to: obtain the orientation of the sensor; calculate a relative position of the at least one element relative to the sensor by using the localization information of the sensor, the localization information of the at least one element and the orientation of the sensor; and configure the sensor according to the relative position of the at least one element relative to the sensor. the data processing device 400 is further adapted to configure the sensor to aim at the at least one element according to the relative position of the at least one element relative to the sensor; and/or to configure the sensor to enhance resolution on a scanning area according to the relative position of the at least one element relative to the sensor.

If the sensor comprises the at least a laser scanner, the data processing device 400 configures the at least a laser scanner by increasing the number of laser rays at a scanning area according to the relative position of the at least one element relative to the sensor.

Furthermore, if the sensor comprises the at least an image signal recording device, the data processing device 400 is further adapted to: focus the at least an image signal recording device according to the relative position of the at least one element relative to the sensor; and/or zoom the at least an image signal recording device according to the relative position of the at least one element relative to the sensor and the dimension information of the element in the digital map.

FIG. 5 shows an example of the use of the laser scanner according to the present invention.

A laser scanner is an extended version of a laser rangefinder, which uses the time-of-flight principle to calculate the distance to an object. A short duration laser pulse is sent from a laser light source, and the reflected light is captured through a receiver. The round trip time it takes for sending and receiving a signal is a measure of the distance to the object. If the round trip time is t, then the distance to the object is calculated as $d=c*t/2$, where d is the distance to the object and c is the speed of light. Since the laser rangefinder detects only one point on the object, its light is rotated using mirrors to detect the entire object or multiple objects over a wide range.

Laser scanner technology is also used in intelligent vehicles with autonomous operation capability to improve safety. Unlike video cameras, laser scanners are more accurate in range and angular resolution. Moreover, these devices are robust in terms of interference with other lighting sources since they send signals from their own source. A laser scanner needs a high-speed processor to process the two-dimensional raw data, the round-trip time, and the angle of the mirror to obtain the actual image. Most laser scanners are equipped with an onboard processor and can easily be interfaced with display units or computers. Special software is also provided if the display unit is integrated with a computer for processing.

Autonomous operation requires the use of various sensors to identify the surroundings. Laser scanners play a vital role in autonomous vehicles due to the fact that a laser scanner integrated with a GPS sensor can identify the vehicle surroundings.

For safety and driving assistance purposes such as real time environment detection, laser scanners are mounted on the front of the vehicle to scan the objects in front of them, as shown in FIG. 5. The vertical coverage area of the laser scanner can be greatly improved using the multilayer scanning technique. In multilayer scanning, several intersecting planes can be scanned successively rather than scanning in only one horizontal planar layer.

FIG. 5 shows clearly that the laser scanner mounted on the vehicle emits more laser rays at a scanning area of the highly correlated objects such as traffic sign 101 as well as the overhead sign 102 than other objects such as trees in order to improve the definition of the sensing data of the highly correlated objects.

FIG. 6 shows the improved sensing data in form of the cloud point of the environment in front of the vehicle detected by the laser scanner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for configuring a sensor which is adapted to be installed on a moving object, the method comprising:
    obtaining, by a data processing device, localization information of the sensor from a localization device;
    obtaining, by the data processing device, characteristic information and localization information of at least one element from a digital map;
    choosing, by the data processing device, one or more elements of the at least one element in the digital map; and
    configuring, by the data processing device, the sensor according to the characteristic information and/or the localization information of the one or more chosen elements,
    wherein the configuring, by the data processing device, the sensor according to the characteristic information and/or the localization information of the one or more chosen elements comprises:
        obtaining, by the data processing device, an orientation of the sensor;
        calculating, by the data processing device, a relative position of the one or more chosen elements relative to the sensor by using the localization information of the sensor, the localization information of the one or more chosen elements and the orientation of the sensor; and
        configuring, by the data processing device, the sensor according to the relative position of the one or more chosen elements relative to the sensor.

2. The method according to claim 1, wherein the sensor comprises a laser scanner, an image signal recording device, and/or a radar device.

3. The method according to claim 1, wherein the characteristic information of the at least one element comprises:
    a type of the at least one element in the digital map,
    a dimension information of the at least one element in the digital map, and/or
    a correlation coefficient of the at least one element in the digital map.

4. The method according to claim 1, wherein the localization device comprises:
    a global navigation satellite system receiver,
    a localization device using cellular signal, or
    a localization device using radio signal.

5. The method according to claim 1, wherein choosing, by the data processing device, one or more elements of the at least one element in the digital map comprises choosing one or more elements of the at least one element in the digital map according to the characteristic information of the one or more elements of the at least one element, and/or localization information of the one or more elements of the at least one element.

6. The method according to claim 1, wherein configuring, by the data processing device, the sensor according to the relative position of the one or more chosen elements relative to the sensor comprises:
    configuring the sensor to aim at the one or more chosen elements according to the relative position of the one or more chosen elements relative to the sensor; and/or
    configuring the sensor to enhance resolution on a scanning area according to the relative position of the one or more chosen elements relative to the sensor.

7. The method according to claim 1, wherein, if the sensor comprises at least a laser scanner, then configuring, by the data processing device, the sensor according to the relative position of the one or more chosen elements relative to the sensor further comprises configuring the at least a laser scanner by increasing the number of laser rays at a scanning area according to the relative position of the one or more chosen elements relative to the sensor.

8. The method according to claim 1, wherein, if the sensor comprises the at least an image signal recording device, then configuring, by the data processing device, the sensor according to the relative position of the one or more chosen elements relative to the sensor further comprises:
    focusing the at least an image signal recording device according to the relative position of the one or more chosen elements relative to the sensor; and/or
    zooming the at least an image signal recording device according to the dimension information of the one or more chosen elements in the digital map.

9. A data processing device for configuration of a sensor which is adapted to be installed on a moving object, wherein the data processing device is configured to:
    obtain localization information of the sensor from a localization device;

obtain characteristic information and localization information of at least one element from a digital map;

choose one or more elements of the at least one element in the digital map;

configure the sensor according to the characteristic information and/or the localization information of the one or more chosen elements;

obtain an orientation of the sensor;

calculate a relative position of the one or more chosen elements relative to the sensor by using the localization information of the sensor, the localization information of the one or more chosen elements and the orientation of the sensor; and configure the sensor according to the relative position of the one or more chosen elements relative to the sensor.

10. The data processing device according to claim 9, wherein the sensor comprises a laser scanner, an image signal recording device, and/or a radar device.

11. The data processing device according to claim 9, wherein the characteristic information of the at least one element comprises:

a type of the at least one element in the digital map, a dimension information of the at least one element in the digital map, and/or a correlation coefficient of the at least one element in the digital map.

12. The data processing device according to claim 9, wherein the localization device comprises:

a global navigation satellite system receiver, a localization device using cellular signal, or a localization device using radio signal.

13. The data processing device according to claim 9, wherein the data processing device chooses the at least an element according to the characteristic information of the one or more elements of the at least one element, and/or localization information of the one or more elements of the at least one element.

14. The data processing device according to claim 9, wherein the data processing device:

configures the sensor to aim at the one or more chosen elements according to the relative position of the one or more chosen elements relative to the sensor; and/or configures the sensor to enhance resolution on a scanning area according to the relative position of the one or more chosen elements relative to the sensor.

15. The data processing device according to claim 9, wherein, if the sensor comprises at least a laser scanner, the data processing device configures the at least a laser scanner by increasing the number of laser rays at a scanning area according to the relative position of the one or more chosen elements relative to the sensor.

16. The data processing device according to claim 9, wherein, if the sensor comprises at least an image signal recording device, the data processing device is further configured to:

focus the at least an image signal recording device according to the relative position of the one or more chosen elements relative to the sensor; and/or zoom the at least an image signal recording device according to the dimension information of the one or more chosen elements in the digital map.

17. A system comprising:

a data processing device according to claim 1; and at least a sensor.

18. The system according to claim 17, wherein the sensor comprises at least a laser scanner.

* * * * *